United States Patent Office 3,822,274
Patented July 2, 1974

3,822,274
PROCESS FOR DIELS-ALDER PRODUCT
Elbert E. Harris, Westfield, and Robert Currie, Scotch Plains, N.J., assignors to Merck & Co., Inc., Rahway, N.J.
No Drawing. Continuation of application Ser. No. 131,828, Apr. 6, 1971, which is a continuation-in-part of application Ser. No. 762,158, Sept. 24, 1968, both now abandoned. This application Feb. 26, 1973, Ser. No. 335,618
Int. Cl. C07d 31/46
U.S. Cl. 260—294.9      5 Claims

ABSTRACT OF THE DISCLOSURE

An improved process for preparing Diels-Alder adducts which are useful pyridoxine intermediates, by reacting an oxazole with a 2-butene dienophile in the presence of an acid binding agent.

CROSS REFERENCES TO RELATED APPLICATIONS

This is a continuation of application Ser. No. 131,828, filed Apr. 6, 1971, now abandoned, which is a continuation-in-part of copending application Ser. No. 762,158, filed Sept. 24, 1968, now abandoned.

BACKGROUND OF THE INVENTION

It is known in the art that Vitamin $B_6$, otherwise known as pyridoxine, may be prepared by the condensation of certain oxazoles with a 2-butene dienophile to form a Diel-Alder adduct. This adduct is then converted into the desired pyridoxine.

The prior art describes various oxazoles and a multitude of derivatives of 2-butene that may be condensed to form the adduct that is the precursor to Vitamin $B_6$. Accordingly, the preparation of Vitamin $B_6$, as suggested by the prior art, may be illustrated structurally as follows:

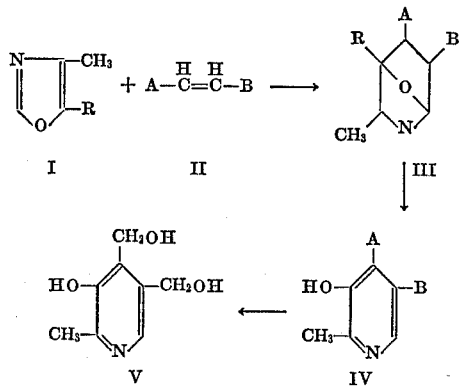

wherein R is loweralkoxy or cyano and A and B are CHO, $CONH_2$, $COOR_1$, COX, $CH_2OR_1$, CN, $CH_2X$, $CH_2OH$,

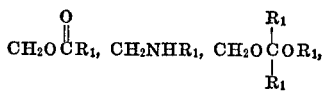

wherein $R_1$ represents hydrogen, loweralkyl, loweralkenyl, phenyl, phenyl loweralkyl, preferably containing from 1-6 carbon atoms and X represents a halogen. Alternatively, A and B can be linked to form a heterocyclic ring by oxygen, sulfur, or nitrogen; or linked to form a dioxepin of the type described in U.S. Pats. 3,296,275 and 3,285,924, and as otherwise known in the art, or linked to form a dioxin of the type disclosed in U.S. Pat. 3,365,-461. When the dienophile is a dioxepin having the structural formula

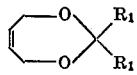

the intermediate compounds are represented by the structural formula

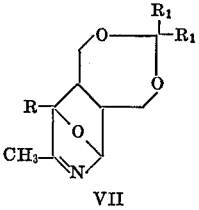 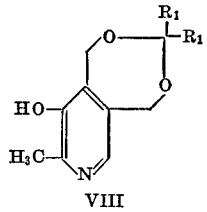

VII                VIII wherein R and $R_1$ have the same meaning as above. Thus, according to the prior art, pyridoxine may be prepared by reacting a diene of Formula I such as 4-methyl-5-cyano (or 5-loweralkoxy) oxazole with a suitable dienophile represented by the compounds of Formula II to produce the intermediate pyridoxine forming adducts of Formula III which rearrange, when treated under acidic conditions, to form first the substituted pyridines of Formula IV which may then be converted to pyridoxine, Formula V.

Heretofore, it had been suggested that the above Diels-Alder reaction was one which could be acid catalyzed and the addition of acid to the reaction medium has been described.

U.S. Pat. 3,296,275 discloses that the overall yield of the process may be improved by producing and isolating the adduct (Formula III) and then carrying out the cleavage in a separate step. It is further stated that in order to maximize the yield of the Diels-Alder adduct obtained by the addition reaction of a compound of Formula I with a compound of Formula II and in order to avoid a premature rearrangement of the adduct during the course of the first step, the process should be carried out under conditions which are as mild as possible.

Notwithstanding the above processes, the yields of Vitamin $B_6$ obtainable by known methods at least from a commercial point of view are less than desired.

SUMMARY OF THE INVENTION

An object of the present invention is provision of an improved process for preparing Diels-Alder adducts which are convertible to Vitamin $B_6$.

DESCRIPTION OF THE PREFERRED EMBODIMENTS

In accordance with the present invention, increased yields of the Diels-Alder adducts of the type exemplified by Formula III and hence increased yields of Vitamin $B_6$ itself, may be obtained by reacting any of the oxazoles of Formula I with a 2-butene derivative of Formula II in the presence of an acid binding agent. The improvement in yield which is obtainable in this manner is surprising in that the prior art indicates that the reaction is either acid catalyzed or self-catalyzed by virtue of the acidic nature of the pyridine of Formula IV.

Once the adduct is formed in accordance with our invention, it may be isolated and subsequently converted to the substituted pyridine of (Formula IV) under optimum conditions, or if desired, the crude adduct may be converted directly to pyridoxine. This latter step, however, is not the subject matter of the present invention.

In the preferred embodiment of the present invention, the desired adducts are prepared by reacting in the presence of an acid binding agent a 4-methyl-5-loweralkoxy oxazole or a 4-methyl-5-cyano oxazole with a 2-butene derivative wherein the substituent referred to as A and B above constitute groups which may be readily converted to the hydroxymethyl group by hydrolysis, suitably by treatment with an aqueous or an ethanolic solution of a mineral acid, such as ethanolic hydrochloric acid or the like. It should be noted, however, that the preference for the dienophile having the A and B groups mentioned above is merely to simplify the latter stages of the entire process for the production of Vitamin $B_6$ and the non-preferred groups are deemed as being equally effective in the presently disclosed improvement in the process of producing Diels-Alder adducts. After completion of the reaction, that is the adduct producing step, the acid binding agent is removed as a residue by filtration and the unreacted oxazole and dienophile distilled under reduced pressure. At this point, the adduct, if desired, may then be isolated by distillation at high vacuum or the crude adduct may be treated *in situ* with acid in order to cleave it.

The reaction times and temperatures utilized to bring about the formation of the desired Diels-Alder adduct will depend to a great extent upon the dienophile employed. Typically, however, the reaction may be suitably effected at a temperature of about 90–180° C., preferably at about 125–135° C., for a period of about 3–60 hours, preferably for about 20–52 hours.

In addition, it has been found that the yield of adduct is further increased by agitating the components during the reaction period.

The quantity of the acid binding agent utilized in the reaction is also not believed to be critical. Accordingly, quantities ranging from about 1–15 percent by weight of the total amount of reactant appears to give satisfactory results, although 1–3 percent have been found to be sufficient in most cases.

As to the acid binding agent, the use of which constitutes the present invention, any agent capable of removing or inactivating traces of acid that may be formed as a by-product during the Diels-Alder reaction and which does not adversely react with either the diene, the dienophile, or the adduct, under the reaction conditions, is suitable. Accordingly, the acid binding agent may include such agents as base; epoxides, exemplified by cyclohexene oxide; and molecular sieves, for example, Linde Type 4A; or calcium carbide. The bases that may be employed as acid binding agents in this process may be organic or inorganic bases, although the inorganic bases have been found most desirable. Thus, suitable inorganic bases include Group IA carbonates and bicarbonates, such as sodium carbonate, potassium carbonate, and sodium bicarbonate; Group IB oxides, such as copper oxide and silver oxide; Group IIA oxides and hydroxides, such as magnesium hydroxide, calcium hydroxide, strontium hydroxide, and barium hydroxide, as well as their corresponding carbonates and bicarbonates; Group IIB oxides such as zinc oxide, cadmium oxide and their corresponding carbonates; and aluminum and silicon oxides. Among the preferred materials are calcium oxide, magnesium oxide and calcium carbonate, as well as calcium carbide and molecular sieves (Linde Type 4A). Of all of these materials, calcium oxide appears most satisfactory from a commercial point of view.

The suitability of other agents which may satisfactorily function as acid binding agents may be determined according to the following procedure:

A 1 gm. aliquot of a mixture containing 2.55 g. of 4-methyl-5-ethoxy oxazole and 10.59 gm. of 1,4-bis (methoxymethoxy) butene-2 is introduced into glass tubes containing 0.1 gm. of an agent to be tested for acid binding capacity.

A control in which the additive is omitted is similarly prepared. The tubes are then sealed and submerged in an oil bath which has been heated to 135°. After a period of 48 hours, the tubes are removed from the bath, cooled, opened and the contents diluted with dioxane to 10 ml. in a volumetric flask. The two solutions are then diluted to 1000 ml. with methanol containing 2% (v./v.) of 0.1 N aqueous hydrochloric acid and the absorption of ultraviolet light at 292 m$\mu$. is immediately measured for each solution. After standing about 16 hours at room temperature, the increase in ultraviolet absorption at 292 m$\mu$. in each sample is determined and compared. A significantly greater increase in ultraviolet light absorption in the test sample when compared with the control is indicative that the additive is satisfactorily performing as an acid binding agent.

Since the pyridoxine forming Diels-Alder adducts prepared according to the present invention are slowly and quantitatively cleaved under certain conditions to form the substituted pyridines of Formula IV, it is possible to demonstrate the actual efficiency and effect on yield of the adduct obtained when certain acid binding agents are used. Table 1 shows the effect on yield when certain acid binding agents are used in preparing the adduct 6-methyl-2,3-bis [(methoxymethoxy)methyl]-1-ethoxy - 5 - aza-7-oxa-[2.2.1]-hept-5-ene. The procedure used in determining this is as follows:

A mixture is made of 2.55 g. (.020 mole) of 4-methyl-5-ethoxyoxazole and 10.59 g. (.060 mole) of 1,4-bis(methoxymethoxy-butene-2. One gram aliquots of this mixture are introduced into glass tubes containing the additives described in Table 1 in the percents, by weight, of the reaction mixture, indicated in that Table. The tubes are sealed and submerged in oil baths at the temperatures indicated, in some cases with agitation of the tubes as noted in the Table.

After running for the times indicated, the tubes are cooled, opened, and the contents diluted with dioxane to 10.0 ml. in a volumetric flask. The unreacted oxazole content is determined by quantitative vapor phase chromatography of an aliquot of this solution on a column of silicone on "Chromosorb W" (a diatomaceous earth obtainable from John Manville). The content of 2-methyl-3-hydroxy - 4,5 - bis[methoxymethoxy)methyl]-pyridine arising from cleavage of the adduct during the reaction is determined by measuring the ultraviolet absorption at 292 m$\mu$. of an aliquot immediately after diluting 100-fold with methanol containing 2% (v./v.) of 0.1 N aqueous hydrochloric acid. On standing overnight at room temperature, the absorption peak at this wavelength increases greatly to a steady value, due to the opening of the adduct, 6-methyl-2,3-bis[(methoxymethoxy)methyl]-1-ethoxy-5-aza-7-oxa-[2.2.1]-hept - 5 - ene to form the chromophore of the pyridine derivative-2-methyl-3-hydroxy - 4,5 - bis[(methoxymethoxy)methyl]-pyridine; this difference in absorbance at 292 m$\mu$. is a measure of the amount of adduct in the mixture, and from its magnitude, the weight and yield can be calculated based on the absorbance of the pyridine IV at this wave length. In Table 1 the yield of adduct is expressed as percent of theory based on unreacted oxazole.

TABLE 1

| Additive | Quantity (percent) | Temp. (° C.) | Time (hrs.) | Adduct yield | Remarks |
|---|---|---|---|---|---|
| None | | 135 | 48 | 11 | No agitation. |
| Molecular sieves: | | | | | |
| Linde 4A | 10 | 135 | 48 | 47 | Do. |
| CaO | 5 | 135 | 48 | 48 | Do. |
| CaCO$_3$ | 7 | 135 | 48 | 29 | Do. |
| CaC$_2$ | 10 | 135 | 48 | 43 | Agitated. |
| CaO | 10 | 135 | 50 | 70 | Do. |
| CaO | 10 | 125 | 50 | 87 | Do. |
| MgO | 10 | 125 | 50 | 71 | Do. |

A mixture is made of 2.14 g. (.017 mole) of 4-methyl-5-ethoxyoxazole and 8.64 g. (0.050 mole) of 1,4-diacetoxybutene-2, and aliquots of this mixture treated and evaluated in a manner analogous to that as described above. Results are given in Table 2.

TABLE 2

| Additive | Qty. (percent) | Temp. (°C.) | Time, hrs. | Yield of pyridine IV (percent) Before acid treatment | Yield of pyridine IV (percent) After acid treatment | Yield of adduct |
|---|---|---|---|---|---|---|
| None | | 125 | 18 | 25 | 25 | 0 |
| CaO | 10 | 125 | 18 | 1.6 | 78 | 76.4 |

EXAMPLE 1

A mixture of 127 g. (1.0 mole) of 4-methyl-5-ethoxyoxazole, 528 g. (3.0 moles) of 1,4-bis(methoxymethoxy)-butene-2, and 65.5 g. of powdered calcium oxide is heated with stirring at 125° C. for 40 hours in a closed flask. After cooling, the calcium oxide is filtered off and residual oxazole and dienophile distilled out at 2 mm. Hg pressure to a pot temperature of 130° C. The residue is distilled in a short path molecular still at 100° C. and a pressure of 0.2 mm. Hg. After further purification by distillation, chromatography in ethyl acetate on alumina, yields 6-methyl - 2,3 - di-[(methoxymethoxy)methyl]-1-ethoxy-5-aza-7-oxa-[2.2.1]-hept-5-ene, b.p. 125° C./0.2 mm., $n_D^{25}$: 1.2578. A methanol solution of this material shows no absorption in the ultraviolet above 260 m$\mu$., as expected.

A sample of this adduct is distilled from a trace of acid at 0.4 mm. Hg, the product boils at 158° C. and crystallizes in the receiver. Recrystallization from hexane yields 2-methyl - 3 - hydroxy-4,5-di-[(methoxymethoxy)methyl]pyridine, m.p.—63–65° C.

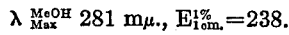

$\lambda_{Max}^{MeOH}$ 281 m$\mu$., $E_{1cm.}^{1\%}$=238.

The material is converted to pyridoxine hydrochloride in quantitative yield by brief heating in 0.1 N aqueous hydrochloric acid.

EXAMPLE 2

A mixture of 50.8 g. (0.4 mole) of 4-methyl-5-ethoxyoxazole, 207.5 g. (1.2 moles) of 2-butene-1,4-dioldiacetate, and 25.7 g. of powdered calcium oxide are stirred and heated at 115° C. for 24 hours in a closed flask. The mixture is cooled, the calcium oxide filtered off, and the filtrate worked up as in Example 1 above to yield the colorless liquid adduct 6-methyl-2,3-di-[(acetoxy)methyl]-1-hydroxy - 5 - aza-7-oxa-[2.2.1]-hept-5-ene, b.p. 128° C. at 0.4 mm. Hg. A dilute methanol solution of this material shows no ultraviolet absorption above 260 m$\mu$., as expected, but treatment with a drop of dilute acid causes the gradual development of a large absorption peak at 292 m$\mu$., characteristic of the chromophore of the expected pyridine structure.

EXAMPLE 3

A mixture of 30 g. (.24 mole) of 4-methyl-5-ethoxyoxazole, 123 g. (.72 mole) of 2-butene-1,4-dioldiacetate, and 3.1 g. of powdered calcium oxide is stirred and heated at 125° C. for 24 hours in a closed flask. The mixture is cooled, and a sample removed and clarified by centrifugation. An aliquot of 1.027 g. is weighed into a 10 ml. volumetric flask and diluted to the mark with isooctane. One ml. of this solution is diluted to 10 ml. with methanol, and one ml. of this is further diluted to 100 ml. with methanol; its optical density at 292 m$\mu$. is 0.018. Employing a molar extinction coefficient of $\epsilon$=8,750 at $\lambda_{max}$=292 m$\mu$. for the chromophore of the pyridine IV, this value indicates a pyridine concentration of $2.06\times10^{-6}$ molar in the cuvette, or a total of $2.06\times10^{-5}$ moles in the entire aliquot. The aliquot represents $1.61\times10^{-3}$ moles of oxazole originally charged, so the yield of pyridine IV derived from it is 1.3% based on oxazole charged. To the final dilution of the aliquot is then added 2 ml. of 0.1 M aqueous hydrochloric acid and the mixture allowed to stand at room temperature overnight. The optical density at max—292 m$\mu$. is 1.105 representing a 78% yield of pyridine IV based on oxazole charged. The yield of adduct III in the sample is thus 76.7%.

The remainder of the reaction mixture is worked up as in Example 2 above to afford the same intermediate adduct III, which may be converted to pyridoxol by known methods, for example by heating in dilute hydrochloric acid or warming in acetic acid to generate the pyridine IV, followed by hydrolysis in dilute aqueous hydrochloric acid.

EXAMPLE 4

A mixture of 42.8 g. (0.30 mole) of 4,7-dihydro-2-isopropyl-1,3-dioxepin, 2.78 g. (0.022 mole) of 4-methyl-5-ethoxyoxazole, and 2.1 g. of powdered calcium oxide is heated under nitrogen at 172° C. for 3 hours, cooled, and filtered. Analysis of an aliquot of the filtrate as described indicates that 66% of the oxazole has reacted and only 2% of the bicyclic adduct has cleaved to the pyridine intermediate. Unreacted dioxepin and oxazole is distilled from the batch in vacuo, and the residue dissolved in 33 ml. of glacial acetic acid containing 0.24 ml. of water. After standing overnight at room temperature the mixture is heated at 95° C. for two hours, concentrated in vacuo to dryness on a rotary evaporator, and recrystallized from dilute hydrochloric acid to afford crystalline vitamin B$_6$ hydrochloride, identified in the usual manner.

EXAMPLE 5

A mixture of 2.54 g. (0.02 moles) of 4-methyl-5-ethoxyoxazole, 15.4 g. (0.12 moles) of 4,7-dihydro-2,2-dimethyl-1,3-dioxepin, and 1.1 g. of powdered calcium oxide is sealed in a glass pressure tube and heated in an oil bath at 180° C. for six hours. The tube is cooled and opened and the contents filtered. The filtrate is concentrated in vacuo on a rotary evaporator to remove unreacted oxazole and dioxepin, and the residue taken up in 36 ml. of glacial acetic acid to which 0.26 ml. of water has been added. After standing overnight at room temperature, the solvent is removed in vacuo, leaving a residue of 1,5 - dihydro - 3,3,8-trimethyl-[1,3]-dioxepino-[5,6-c]-pyridine-9-ol. This residue is dissolved in 25 ml. of 1 M hydrochloric acid and heated at 80° C. for 45 minutes. The resulting vitamin B$_6$ hydrochloride is isolated by concentrating in vacuo to a thick slurry and filtering. It may be purified by recrystallization from hot water in the usual manner.

Other dioxepins that can be employed in the process include: 4,7-dihydro - 2 - methyl-1,3-dioxepin, 4,7-dihydro-2-n-propyl - 1,3 - dioxepin, 4,7-dihydro-2-phenyl-1,3-dioxepin, and the like.

What is claimed is:

1. In the process of reacting an oxazole with a 2-butene dienophile to produce a Diels-Alder adduct which is convertible to pyridoxine, the improvement which comprises effecting the reaction of an oxazole of the formula

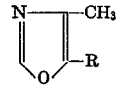

wherein R is loweralkoxy or cyano with a 2-butene derivative selected from the group consisting of

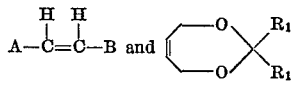

wherein A and B represent CHO, CONH$_2$, COOR$_1$, COX, CH$_2$OR$_1$, CN, CH$_2$X, CH$_2$OH,

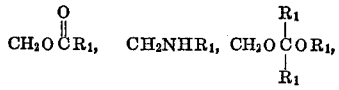

and R$_1$ represents hydrogen, loweralkyl, loweralkenyl, phenyl, phenyl loweralkyl and X represents a halogen in the presence of an acid binding agent.

2. The process according to Claim 1 wherein the acid binding agent is calcium oxide.

3. The process according to Claim 1 wherein the acid binding agent is magnesium oxide.

4. The process according to Claim 1 wherein the acid binding agent is calcium carbonate.

5. The process according to Claim 1 wherein the acid binding agent is calcium carbide.

References Cited

UNITED STATES PATENTS

| | | | |
|---|---|---|---|
| 3,525,749 | 8/1970 | Chamberlin et al. | 260—297.5 |
| 3,250,778 | 5/1966 | Kimel et al. | 260—295 VB |

ALAN L. ROTMAN, Primary Examiner

U.S. Cl. X.R.

260—295 T, 295 VB, 297 T, 297 V, 297.5